Patented Dec. 23, 1930

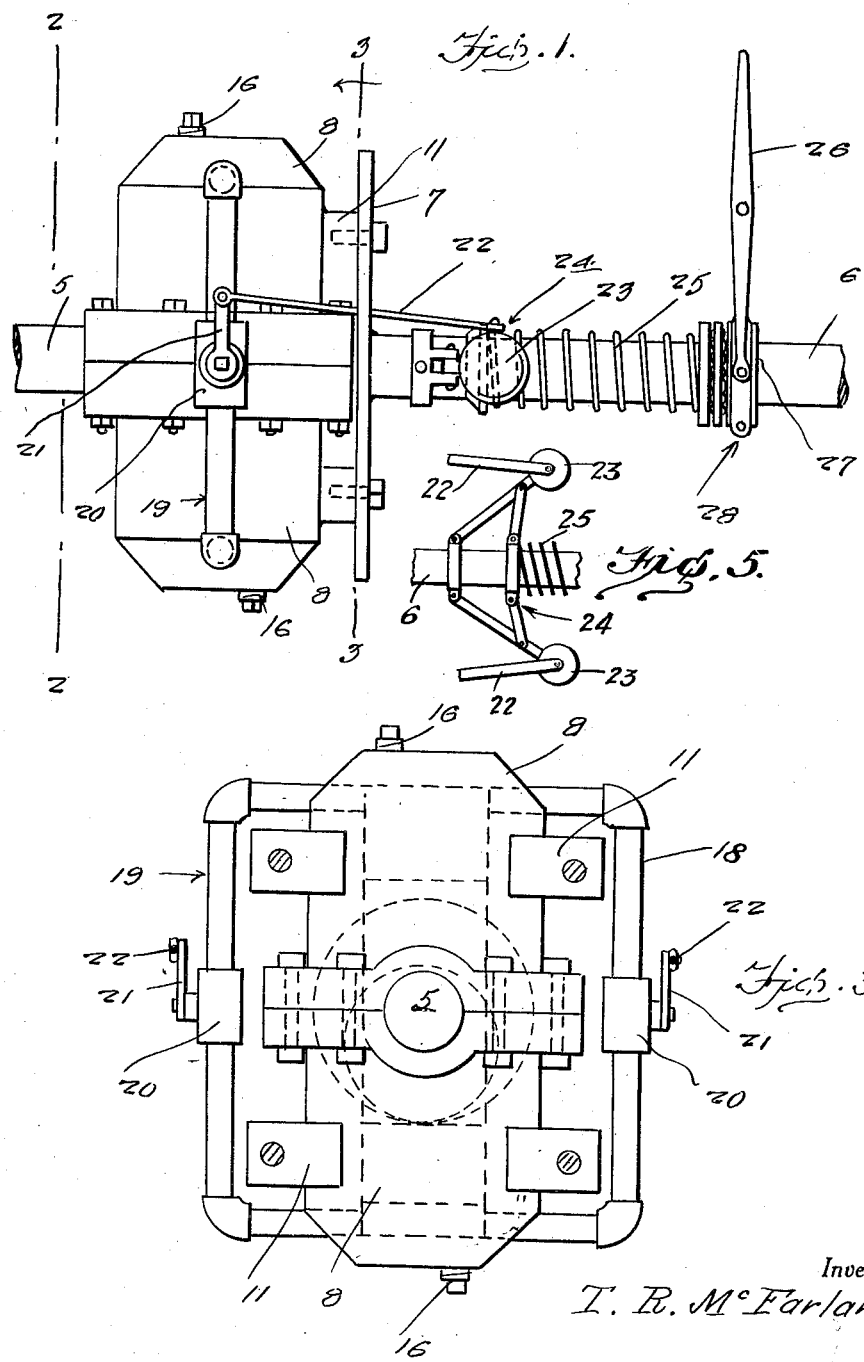

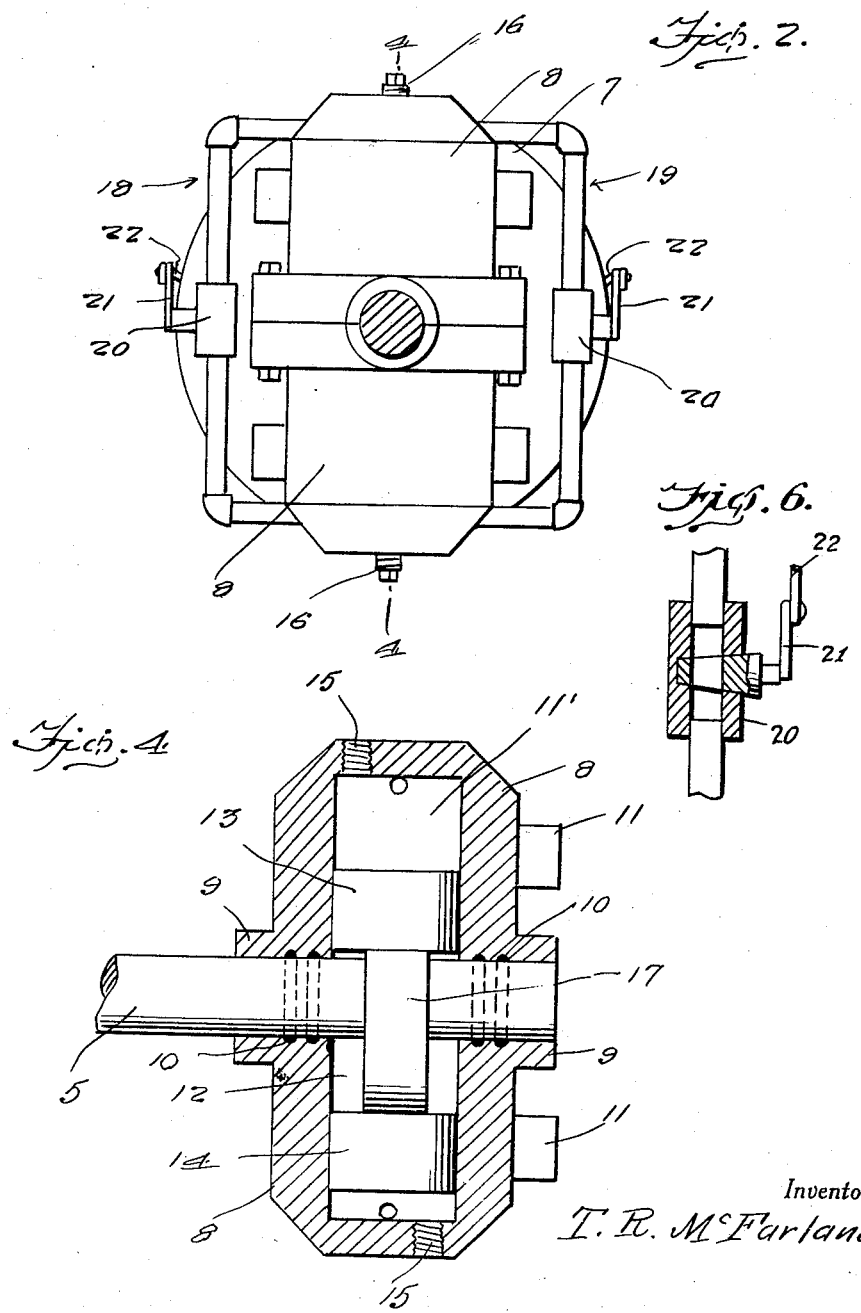

1,786,356

UNITED STATES PATENT OFFICE

THOMAS R. McFARLAND, OF SAWTELLE, CALIFORNIA

POWER TRANSMISSION

Application filed April 30, 1929. Serial No. 359,249.

This invention relates to an improved transmission structure which is capable of use in association with automobiles and analogous motor vehicles.

In carrying the invention into effect I have evolved and produced what I believe to be a novel governor controlled fluid clutch device for coupling drive and driven shafts together to insure a positive and speed controlled transmission.

The particular details employed for carrying the invention into effect will become more readily apparent from the following description and drawings.

In the drawings:

Figure 1 is an elevation view of a transmission structure constructed in accordance with the present invention.

Figure 2 is a transverse vertical section on the plane of the line 2—2 of Figure 1.

Figure 3 is a similar sectional view on the plane of the line 3—3 of Figure 1.

Figure 4 is a section on the line 4—4 of Figure 2.

Figure 5 is a detail view in top plan showing the centrifugal governor which actuates the control valves.

Figure 6 is a detail view in section showing one of the control valves.

The complete structural association of parts may well be seen in Figure 1 wherein it will be observed that the reference character 5 designates the drive shaft, and the reference character 6 the complemental power take off or driven shaft. The ends of these shafts are spaced apart and the shaft 6 is provided with a shaft connecting disk 7 and this disk is associated with a novel fluid clutch device, the fluid clutch device being immediately associated with the adjacent end portion of the shaft 5.

As clearly seen in Figures 2 and 4 the fluid clutch device comprises a casing composed of companion sections 8 having their adjacent end portions disposed in abutting relation and forming the half portions 9 of a bearing in which the end of the drive shaft 5 is mounted as seen in Figure 4. These bearings are provided with appropriate packing rings or elements 10. The casing sections are formed with lugs 11 with which the disc 7 is fastened. The casing sections are of hollow construction and are provided with cylindrical chambers 11' and 12 constituting opposed cylinders. Freely slidable in these cylinders are piston blocks 13 and 14 respectively. The reference characters 15 designate screw threaded holes in which plugs 16 are threaded. These plugs and openings provide for filling of the cylinders with lubricant or a heavy fluid. The end of the shaft 5 terminates flush with the right hand end of the bearing structure 9 of the casing as seen in Figure 4. This shaft is provided with a cam which is disposed between and cooperable with the piston blocks. The reference characters 18 and 19 designates generally fluid circulating pipes made up of a plurality of sections having their end branches connected and communicating with the respective cylinders 11' and 12 in an obvious manner. Each circulating pipe is provided with a coupling 20 carrying a rotary plug valve for controlling the circulation of the oil through the pipes and cylinders. Each valve includes a crank arm 21 for operating it. Links 22 are connected with these crank arms and extend at right angles thereto as seen in Figure 1 where they are pivotally connected with the balls 23 on the free ends of the arms of a centrifugal governor structure generally designated by the reference character 24. This governor is mounted on the shaft 6. The reference character 25 merely designates the pressure spring for tensioning the governor and this spring is under the action of a pivoted control lever 26 having a fork 27 acting on the sliding collar assembly 28. The activity of the governor can be regulated by tensioning and releasing the spring through the medium of this control lever structure.

From the foregoing description it will be seen that the fundamental idea consists in the provision of a transmission embodying alined shafts with a fluid clutch structure therebetween, said clutch structure being characterized by a double cylinder casing with individual pistons located therein on opposite sides of a cam, the action of the oil circulated through the cylinder being under the control of the centrifugal governor whereby to regulate the valves and to produce a desired driving action between the two shafts. The oil valves are regulated by the governor according to the speed of the car. The valves are so regulated that the car will go under motion when thrown into gear. This automatic transmission is of course supplemented in its work by another transmission which provides for neutral and for directioning the car.

It is understood that when the valves in the fluid circulating pipes are opened, the circulation of fluid will be rapid and substantially unhampered. When however the valves are partly closed or completely closed under the action of the controlling connections between the governor and links, it is obvious that the resistance set up will produce the desired binding action of the pistons against opposite sides of the cam, whereby to permit effective transmission of power from the main shaft 5 to the supplemental shaft 6.

It is thought that by considering the description in connection with the drawings the reader will be able to obtain a clear understanding of the construction, operation and features and advantages of the invention. Therefore, a more lengthy description is regarded unnecessary.

Minor changes in size, shape and rearrangement of details coming within the field of invention claimed may be resorted to in actual practice if desired.

Having thus described the invention, what I claim as new and desire to secure by Letters Patent is:—

1. In a transmission structure of the class described, a main drive shaft, a driven shaft associated therewith, a plate fixed on one end of said driven shaft, a valved fluid clutch device carried by the plate through which the drive shaft rotatably extends, a centrifugal governor carried by said driven shaft, operating links between the arms of said governor and the valves of said clutch, and spring means for regulating the sensitivity of operation of the governor, said spring means comprising a coil spring surrounding said driven shaft and a collar assembly and pivoted operating lever therefor.

2. In a structure of the class described, a clutch device comprising a casing composed of companion sections formed into cylinders, the adjacent ends of said sections being connected together and fashioned to provide a shaft bearing, a drive shaft mounted for rotation in said bearing, that portion of the shaft confined in said casing being provided with a cam, piston blocks mounted for reciprocatory motion in the cylinders on opposite sides of and cooperable with said cam, valved circulating pipes connected at their opposite ends with diametrically opposite sides of said cylinders, operating links connected with the valves in said pipes, a driven shaft, a governor on said shaft, said operating links being connected with said governor, and a disc fixed on said driven shaft, and fastened to said casing.

In testimony whereof I affix my signature.
THOMAS R. McFARLAND.